United States Patent
Bank et al.

(10) Patent No.: US 9,088,629 B2
(45) Date of Patent: Jul. 21, 2015

(54) MANAGING AN ELECTRONIC CONFERENCE SESSION

(71) Applicant: INTERNATIONAL BUSINESS MACHINES CORPORATION, Armonk, NY (US)

(72) Inventors: Judith H. Bank, Morrisville, NC (US); Patrick J. O'Sullivan, Ballsbridge (IE); Mark E. Wallace, Blackrock (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

(21) Appl. No.: 13/632,652

(22) Filed: Oct. 1, 2012

(65) Prior Publication Data

US 2014/0095604 A1 Apr. 3, 2014

(51) Int. Cl.
*H04L 29/06* (2006.01)
*G06F 9/50* (2006.01)
*H04L 12/18* (2006.01)

(52) U.S. Cl.
CPC ............ *H04L 65/403* (2013.01); *G06F 9/5083* (2013.01); *H04L 12/1822* (2013.01); *H04L 12/1868* (2013.01)

(58) Field of Classification Search
CPC ...... G06F 15/16; G06F 9/5083; H04L 65/403

USPC .......................................... 709/204, 203, 235
See application file for complete search history.

(56) References Cited

U.S. PATENT DOCUMENTS 8,060,626 B2    11/2011   Roy et al.
2008/0063173 A1*  3/2008   Sarkar et al. ............. 379/202.01

OTHER PUBLICATIONS

"Dynamically load balancing user sessions, in the Citrix XenApp," [Online] Presentation Server forum on BrianMadden.com Sep. 9, 2008 [retrieved Oct. 1, 2012] retrieved from the Internet: <http://www.brianmadden.com/forums/t/31050.aspx>, 4 pgs.

* cited by examiner

*Primary Examiner* — Ario Etienne
*Assistant Examiner* — Sahera Halim
(74) *Attorney, Agent, or Firm* — Cuenot, Forsythe & Kim, LLC (57) ABSTRACT

An electronic conference session is managed. The electronic conference session is hosted on a processing system for a plurality of users to participate in the conference session via a plurality of client devices. Performance of the processing system is monitored. Responsive to identifying a first indication that the performance of the processing system imminently will degrade below specified criteria, at least one process for hosting the electronic conference session is offloaded from the processing system to at least one of the client devices.

18 Claims, 4 Drawing Sheets

MANAGING AN ELECTRONIC CONFERENCE SESSION

BACKGROUND

Arrangements described herein relate to managing an electronic conference session.

An example of an electronic meeting is a web conference. The use of web conferencing has grown significantly over the last decade, facilitated by the proliferation of communication networks, such as the Internet and mobile communication networks, and increases in available bandwidth. These services are valuable tools in the present communication age.

Web conferencing is a service that allows conferencing events to be shared with remote locations. In general, the service is made possible by Internet technologies, particularly on TCP/IP connections. Web conferencing allows real-time point-to-point communications as well as multicast communications from one sender to many receivers during a Web conference. Further, Web conferencing offers information, such as text-based messages, voice and video chat to be simultaneously shared across geographically dispersed locations. Applications for web conferencing include, but are not limited to, meetings, training events, lectures, or short presentations.

BRIEF SUMMARY

One or more embodiments disclosed within this specification relate to managing an electronic conference session.

An embodiment can include a method of managing an electronic conference session. The method can include, on a processing system, hosting the electronic conference session for a plurality of users to participate in the conference session via a plurality of client devices. The method further can include monitoring, via a processor, performance of the processing system. Responsive to identifying a first indication that the performance of the processing system imminently will degrade below specified criteria, at least one process for hosting the electronic conference session can be offloaded from the processing system to at least one of the client devices.

Another embodiment can include a processing system having a processor. The processor can be configured to initiate executable operations including hosting the electronic conference session for a plurality of users to participate in the conference session via a plurality of client devices. The executable operations further can include monitoring performance of the processing system. Responsive to identifying a first indication that the performance of the processing system imminently will degrade below specified criteria, at least one process for hosting the electronic conference session can be offloaded from the processing system to at least one of the client devices.

Another embodiment can include a computer program product for managing an electronic conference session. The computer program product can include a computer-readable storage medium having stored thereon program code that, when executed, configures a processor to perform operations including, on a processing system, hosting the electronic conference session for a plurality of users to participate in the conference session via a plurality of client devices. The executable operations further can include monitoring performance of the processing system. Responsive to identifying a first indication that the performance of the processing system imminently will degrade below specified criteria, at least one process for hosting the electronic conference session can be offloaded from the processing system to at least one of the client devices.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Arrangements described herein relate to managing an electronic conference session (hereinafter "conference session"). A conference session can be hosted on a processing system for user participation via a plurality of client devices. During the conference session, performance of the processing system hosting the conference session can be monitored. If an indication that the performance of the processing system imma- nently will degrade below specified criteria is identified, one or more processes for hosting the conference session can be offloaded from the processing system to one or more of the client devices. For example, all processes for hosting the conference session can be offloaded to a client device, or certain processes for hosting the conference session can be offloaded to the client device. Accordingly, the conference session can continue seamlessly, without interruption, loss of data or quality degradation of information exchanged in the conference session, even when the processing system becomes heavily loaded. When the performance of the processing system has improved and is at least equal to the specified criteria, the process(es) previously offloaded to the client device can be offloaded from the client device back to the processing system. As used herein, the term "offload" means to transfer from one system or device to another system or device.

Figure 1:
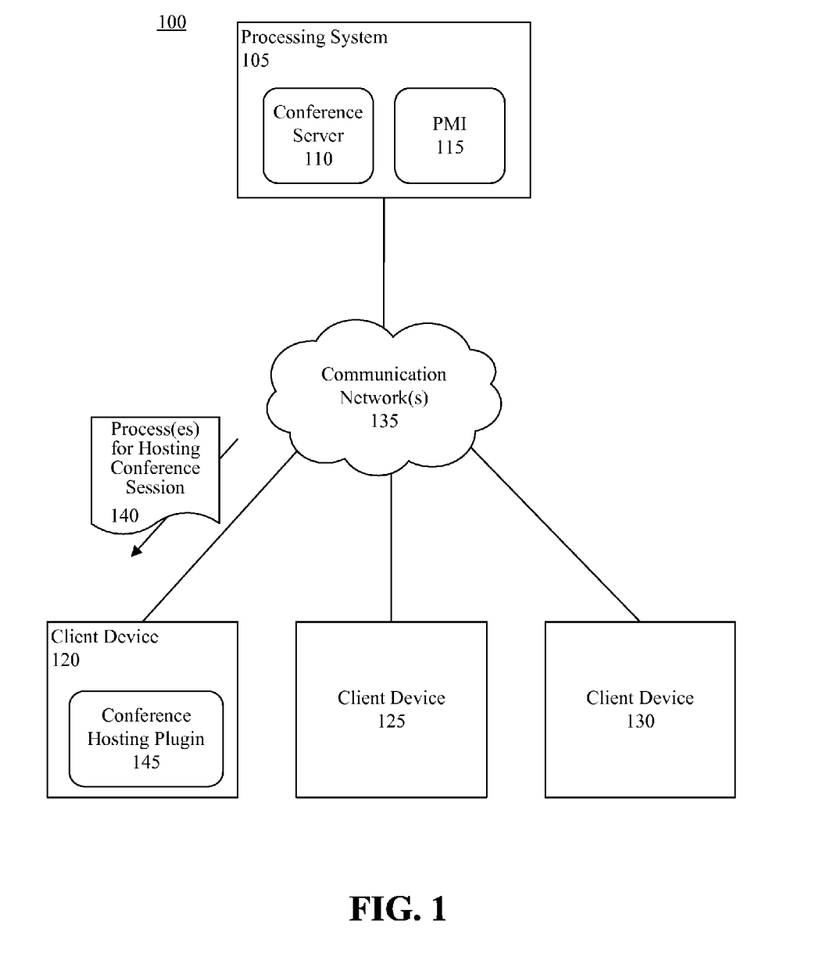
FIG. 1 is a block diagram illustrating a system for managing an electronic conference session in accordance with an embodiment disclosed within this specification.

FIG. 1 is a block diagram illustrating a system 100 for managing an electronic conference session in accordance with one embodiment disclosed within this specification. The system can include a processing system 105. The processing system 105 can be any system including at least one processor which is suitable for executing a conference server application (hereinafter "conference server") 110 configured to host conference sessions. In illustration, the conference server 110 can host web conference sessions (e.g., webinars) that support communication via audio, video and/or still images. The web conference session also can support instant messaging (IM) communication among participants, or between participants and a particular participant, such as a moderator. Still, a variety of other types of conference sessions can be hosted by the conference server 110 and the present arrangements are not limited in this regard. As used herein, the term "participant" means a user (i.e. human being) participating in a conference session.

The processing system 105 also can execute performance monitoring infrastructure (PMI) 115 that monitors various performance parameters of the processing system 105, for example while executing the conference server 110. As used herein, the term "performance parameter" means any parameter related to a processing system that may impact the processing system's performance in supporting one or more conference sessions.

In illustration, a performance parameter monitored by the PMI 115 can be a quality of service (QoS) provided by the processing system 105. For example, the PMI 115 can monitor response times of the conference server 110, page refresh rates of the conference server 110, latency in routing of in-conference instant messaging (IM) interactions, latency in packet exchange affecting communication of unified telephony data, voice over IP (VoIP) data, video data and/or image data, latency in propagation of content from a participant in a conference session to the conference server 110 and/or from the conference server 110 to participants, differential latencies between a participant (e.g., a moderator) and remote participants due to network proximity, and so on.

Other performance parameters of the PMI 115 that can be monitored may include a number of concurrent conference sessions currently hosted by the processing system 105, a number of active participants and/or client devices currently participating in conference sessions hosted by the processing system 105 (e.g., via the conference server 110 and/or other conference servers that may be executed on the conferencing system), and/or hardware resources utilized by the processing system 105 (e.g., processor and/or memory consumption). Performance parameters the PMI 115 can monitor also may include an input/output (I/O) rates for information communicated to, and communicated by, the processing system 105. Still, the PMI 115 can monitor any other performance parameters that relate to, or may impact, performance of the processing system 105 in supporting one or more conference sessions.

The system 100 also can include a plurality of client devices (hereinafter "clients") 120, 125, 130 configured to communicate with the conference server 110 during a conference session. Examples of clients include, but are not limited to, a computer (e.g., a workstation a desktop computer, a laptop computer, a mobile computer, a tablet computer, etc.), a personal digital assistant, a smart phone, a telephone, an appliance, or any other suitable device via which a user may participate in a conference session.

The processing system 105 and the clients 120-130 can be communicatively linked to one or more communication networks 135. The communication networks(s) 135 can include one or more public networks and/or one or more private networks. Examples of a public networks include, but are not limited to, the Internet, a public switched telephone network (PSTN), a cellular communication network, and the like. Examples of a private network include, but are not limited to, a LAN, a WAN, a wireless LAN, a wireless WAN and a virtual private network (VPN). Even though a VPN may be established via the Internet, it may still be considered to be a private network.

In operation, the conference server 110 can host a conference session for user participation via the clients 120-130. At least initially, during the conference session the clients 120-130 can communicate with the conference server 110 via the communication network(s) 135 to support participation in the conference session by respective participants (e.g., users participating in the conference session, including one or more moderators). As noted, the PMI 115 can monitor various performance parameters of the processing system 105. More particularly, the PMI 115 can compare the various performance parameters to specified criteria. As used herein, the term "specified criteria" means criteria that specify minimum threshold values for performance parameters of the processing system 105. The performance parameters can be those previously described, or any other suitable performance parameters.

Responsive to identifying an indication that the performance of the processing system immanently will degrade below specified criteria, for example by comparing the performance parameters to the specified criteria, at least one process 140 for hosting the conference session can be offloaded from the processing system 105 to at least one of the clients 120-130. By way of example, the process(es) 140 can be offloaded to the client 120. The client 120 can be that of a participant in the conference session who is a moderator in the conference session, though the present arrangements are not limited in this regard.

In one non-limiting arrangement, the process(es) 140 can be offloaded to the client 120 in accordance with a policy that indicates the process(es) 140 only can be offloaded when the total number of participants in the conference session is below a threshold level. The threshold level can be determined based on an anticipated level or resources (e.g., processing power and/or available memory) of the client 120 and/or network bandwidth available to the client 120.

The process(es) 140 can include all processes necessary for hosting the conference session, or only certain processes. In an arrangement in which all processes 140 necessary for hosting the conference session are be offloaded to the client 120, the processing system 105 need only be minimally tasked with monitoring the conference session. Thus, the process(es) 140 can be suspended and/or annihilated on the processing system 105, thus freeing up resources on the processing system 105. Via the communication network(s) 135, the client 120 can communicate with other clients 125-130 and the processing system 105, as may be necessary, to execute the process(es) offloaded to the client 120.

In an arrangement in which only certain processes 140 are offloaded, the processing system 105 can offload to the client 120 the certain processes 140. In one aspect, the certain process(es) 140 can be related to IM. For example, the processing system 105 can offload to the client 120 a process to establish and/or host a private IM session for instant messages generated by participants of the conference session during the conference session. Such IM session can function without involvement of the processing system 105. In this regard, jump start logic can be executed on the client 120 in parallel with logic of the conference server 110 to establish the IM session now hosted by the client 120. Such logic provided by the client 120 and/or the conference server 110 can implement a series of handshakes with the clients 125-130 to affirm that the client 120 is now hosting the private IM communication session related to the conference session.

In another aspect, the certain process(es) 140 offloaded can be related to distributing the conference session information (or portions of the conference session information, such as presentation of video and/or still images) to other clients 125-130, receiving from the other clients 125-130 conference session information, and/or processing conference session information generated by the other clients 125-130 and/or the conference server 110. In one non-limiting embodiment, such other clients 125-130 can be located in a particular geographic region in which the client 120 is located. In other embodiments, the processing system 105 can offload the processes 140 to two or more of the clients 120-130. For example, certain processes can be offloaded to the client 120, certain processes can be offloaded to the client 125, certain processes can be offloaded to the client 130, and so on. Again, the respective clients 120-130 and/or the processing system 105 can communicate among one another via the communication network(s) 135.

Regardless of whether all processes 140, or only certain processes 140, are offloaded from the processing system 105 to one or more clients 120-130, the performance of the processing system 105 can improve due to the offloading of the processes 140. Such improvement can be due to reduced usage of hardware resources by the processing system 105, reduced network bandwidth used by the processing system 105, etc.

In some circumstances, the client 120 and/or other clients 125-130 to which the process(es) 140 are offloaded may not be configured to handle certain features normally provided by the conference server 110, such as processing of IM communications, group/forum support and/or hand waving recognition. In such circumstances, the conference server 110 can notify the participants of the conference session that such features are, at least temporarily, disabled for the conference session.

In one arrangement, the client 120, or any other clients 125-130, can include a conference hosting plugin 145 configured to receive processes 140 offloaded from the processing system 105, and execute such processes. When the process(es) 140 is/are to be offloaded to the client 120, for example, the processing system 105 can query the client 120 to determine whether the plugin 145 is installed on the client 120. If the client 120 answers affirmatively, indicating that the plugin 145 is installed, the processing system 105 can offload the process(es) to the client 120. The plugin 145 can be configured to execute such processes 140 on the client 120. In an arrangement in which a plurality of clients include respective plugins 145, respective processes 140 can be allocated to the respective plugins. For example, respective plugins 145 each can be assigned processes related to respective geographic regions, such as geographic regions in which the respective clients 120-130 are located.

In one aspect, one or more of the clients 120-130 may not already have the plugin 145 installed. The processing system (e.g., the conference server 110) can communicate a message to such clients 120-130 prompting the clients 120-130 to install the plugin 145 in a client application used by the clients 120-130 to participate in the conference session, for example to a web browser, or other suitable application, used to by a participant to participate in the conference session. Such message can be communicated before or after the start of the conference session. Respective users (i.e., participants in the conference session) can accept or deny installation of the plugins 145 onto the respective clients 120-130. The conference server 110 can be configured to offload the process(es) 140 only to clients 120-130 that have installed respective plugins 145. In another arrangement, the plugin(s) 145 can be previously included in the client application(s) used to participate in the conference session.

Even after the processes 140 for hosting the conference session are offloaded to one or more of the clients 120-130, the PMI 115 can continue to monitor various performance parameters of the processing system 105. When the PMI 115 identifies an indication that the performance of the processing system 105 has improved and is at least equal to the specified criteria, the process(es) 140 for hosting the conference session can be offloaded from the client(s) 120-130 back to the processing system 105. Again, such transfer can be implemented seamlessly, without interruption, loss of data or quality degradation of the information exchanged in the conference session. Any features of the conference session that were previously disabled when the process(es) 140 was/were transferred to one or more of the clients 120-130 can be enabled when such process(es) 140 is/are offloaded back to the processing system 105. Further, the conference server 110 can notify the participants of the conference session that such features now are enabled for the conference session.

Figure 2:
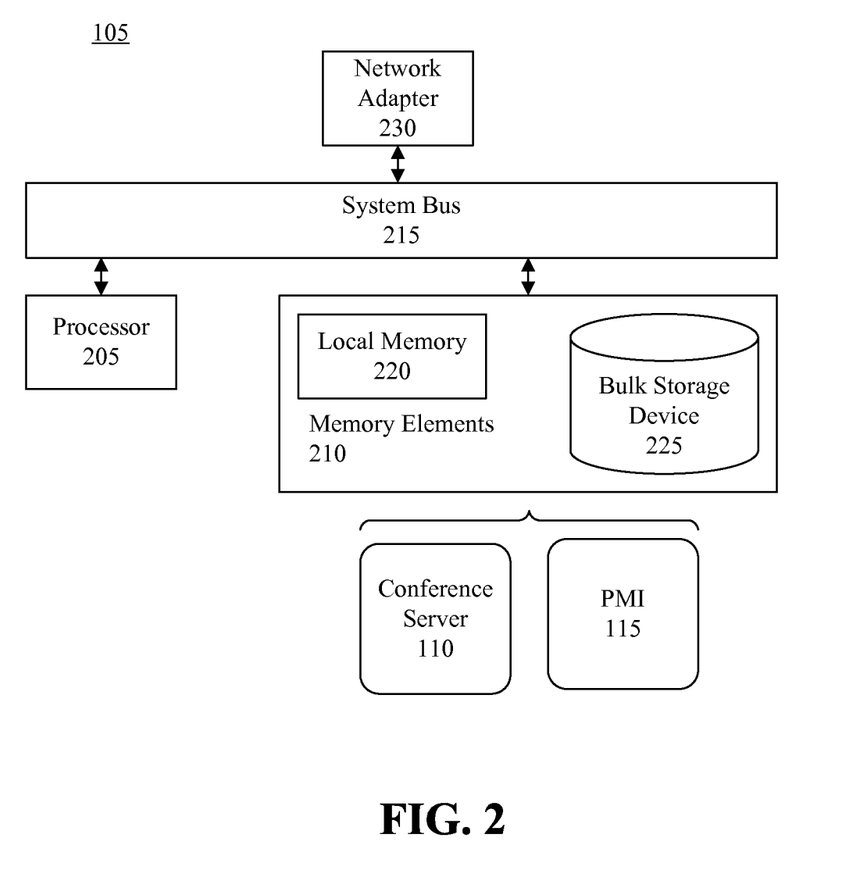
FIG. 2 depicts a block diagram of a processing system configured to manage an electronic conference session in accordance with an embodiment disclosed within this specification.

FIG. 2 depicts a block diagram of a processing system 105 configured to manage an electronic conference session in accordance with an embodiment disclosed within this specification.

The processing system 105 can include at least one processor 205 coupled to memory elements 210 through a system bus 215 or other suitable circuitry. As such, the processing system 105 can store program code within the memory elements 210. The processor 205 can execute the program code accessed from the memory elements 210 via the system bus 215. It should be appreciated that the processing system 105 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to RAM or other non-persistent memory device(s) generally used during actual execution of the program code. The bulk storage device(s) 225 can be implemented as a hard disk drive (HDD), solid state drive (SSD), or other persistent data storage device. The processing system 105 also can include one or more cache memories (not shown) that provide temporary storage of at least some program code in order to reduce the number of times program code must be retrieved from the bulk storage device 225 during execution.

Input/output (I/O) devices such as one or more network adapters 230 can be coupled to the processing system 105. The I/O devices can be coupled to the processing system 105 either directly or through intervening I/O controllers. The network adapter(s) 230 can enable processing system 105 to become coupled to other systems, such as client devices, computer systems, remote printers, and/or remote storage devices through intervening private or public networks. Modems, cable modems, and Ethernet cards are examples of different types of network adapters 230 that can be used with processing system 105.

As pictured in FIG. 2, the memory elements 210 can store the components of the processing system 105 depicted in FIG. 1, namely the conference server 110 and the PMI 115. Being implemented in the form of executable program code, the conference server 110 and the PMI 115 can be executed by the processing system 105 (e.g., via the processor 205) and, as such, can be considered part of the processing system 105. The conference server 110 and PMI 115 can be executed by the processing system 105 to perform the respective functions described herein.

Figure 3:
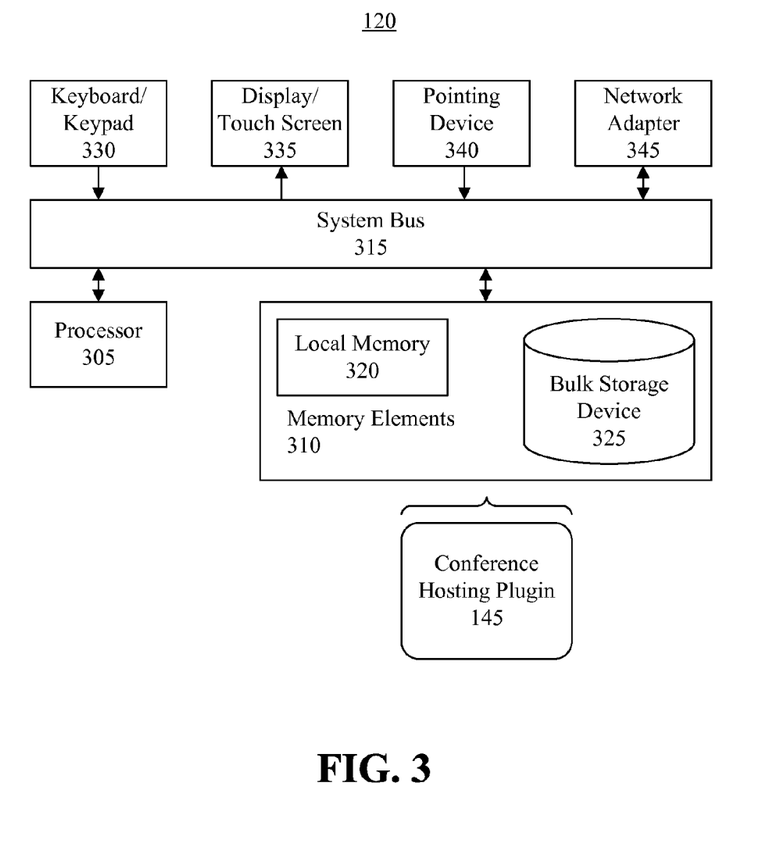
FIG. 3 depicts a block diagram of a client device in accordance with an embodiment disclosed within this specification.

FIG. 3 depicts a block diagram of a client device (hereinafter "client") 120 in accordance with an embodiment disclosed within this specification. The clients 125, 130 of FIG. 1 can be configured in a similar manner.

The client 120 can include at least one processor 305 coupled to memory elements 310 through a system bus 315 or other suitable circuitry. As such, the client 120 can store program code within the memory elements 310. The processor 305 can execute the program code accessed from the memory elements 310 via the system bus 315. It should be appreciated that the client 120 can be implemented in the form of any system including a processor and memory that is capable of performing the functions and/or operations described within this specification.

The memory elements 310 can include one or more physical memory devices such as, for example, local memory 320 and one or more bulk storage devices 325. The client 120 also can include one or more cache memories (not shown) that provide temporary storage of at least some program code in order to reduce the number of times program code must be retrieved from the bulk storage device 325 during execution.

Input/output (I/O) devices such as a keyboard and/or keypad 330, a display and/or touchscreen 335 a pointing device 340 and one or more network adapters 345 can be coupled to the client 120. The I/O devices can be coupled to the client 120 either directly or through intervening I/O controllers. For example, the display/touch screen 335 can be coupled to the client 120 via a graphics processing unit (GPU), which may be a component of the processor 305 or a discrete device. The network adapters 345 can enable client 120 to become coupled to other systems (e.g., the processing system 105), other client devices, remote printers, and/or remote storage devices through intervening private or public networks. Modems, cable modems, and Ethernet cards are examples of different types of network adapters 345 that can be used with client 120.

As pictured in FIG. 3, the memory elements 310 can store the components of the client 120, such as the conference hosting plugin 145. Being implemented in the form of executable program code, the conference hosting plugin 145 can be executed by the client 120 (e.g., via the processor 305) and, as such, can be considered part of the client 120. The conference hosting plugin 145 can be executed by the client to perform the respective functions described herein.

Figure 4:
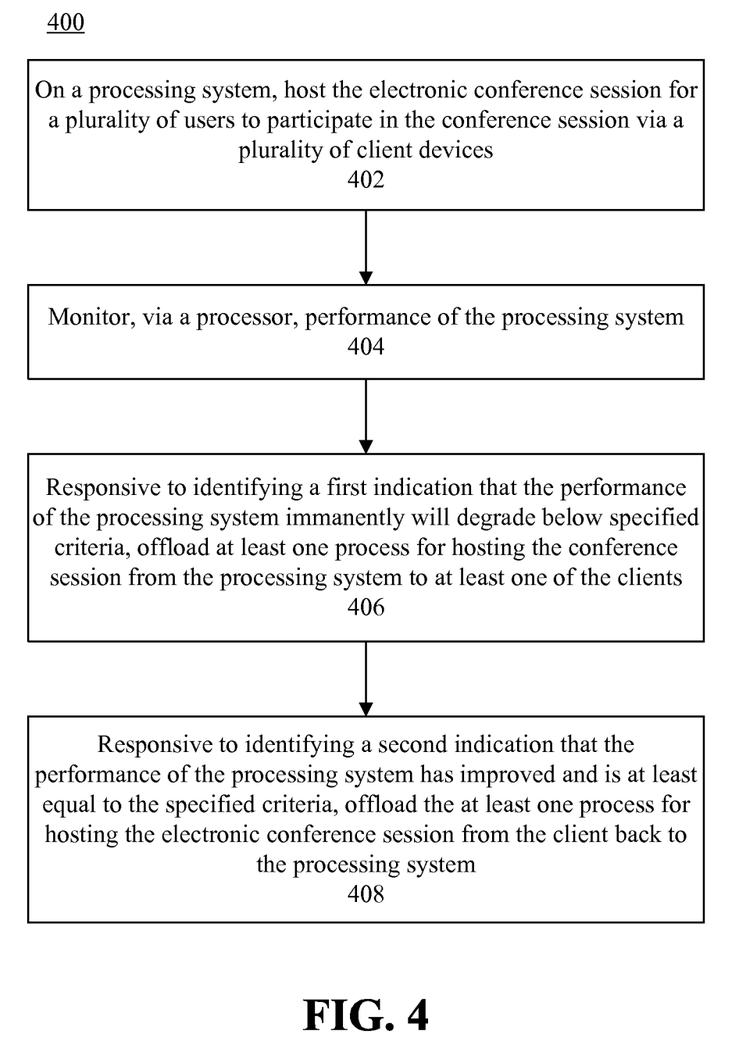
FIG. 4 is a flow chart illustrating a method of managing an electronic conference session in accordance with an embodiment disclosed within this specification.

FIG. 4 is a flow chart illustrating a method 400 of managing an electronic conference session (hereinafter "conference session") in accordance with an embodiment disclosed within this specification. At step 402, on a processing system, the conference session can be hosted for a plurality of users to participate in the conference session via a plurality of client devices (hereinafter "clients"). In this regard, one or more participants can participate in the conference session via each of the clients.

At step 404, performance of the processing system can be monitored via a processor. For example, the processor can execute the PMI to monitor the processing system. At step 406, responsive to identifying a first indication that the performance of the processing system immanently will degrade below specified criteria, at least one process for hosting the conference session can be offloaded from the processing system to at least one of the clients. For example, all processes for hosting the conference session can be offloaded to the client, or only certain processes for hosting the conference session can be offloaded to the client. In one arrangement, an offloaded process can be a process configured to host an instant messaging session for instant messages generated by participants of the conference session during the conference session. In one aspect, the client can be queried to determine whether a plugin configured to receive transfer of the process for hosting the conference session is installed on the client. Responsive to determining that the plugin is installed on the client, offloading of the at least one process for hosting the conference session from processing system to the client can be initiated.

The client to which the at least one process for hosting the conference session is transferred can be selected based on a geographic region in which the client resides. Offloading of the at least one process for hosting the conference session from the processing system to at least one of the clients can be responsive to determining that a total number of participants in the conference session is below a threshold level.

At step 408, responsive to identifying a second indication that the performance of the processing system has improved and is at least equal to the specified criteria, the at least one process for hosting the conference session can be offloaded from the client back to the processing system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A method of managing an electronic conference session, the method comprising:

on a processing system, hosting the electronic conference session for a plurality of users to participate in the conference session via a plurality of client devices;

monitoring, via a processor, performance of the processing system;

responsive to identifying a first indication that the performance of the processing system immanently will degrade below specified criteria, querying at least one of the plurality of client devices to determine whether a plugin configured to receive transfer of at least one process for hosting the electronic conference session is installed on the at least one client device; and responsive to determining that the plugin is installed on the at least one of the plurality of client devices, offloading the at least one process for hosting the electronic conference session from the processing system to the at least one of the plurality of client devices.

2. The method of claim 1, wherein offloading the at least one process for hosting the electronic conference session from the processing system to the at least one of the plurality of client devices comprises:

offloading all processes for hosting of the electronic conference session from the processing system to the at least one of the plurality of client devices.

3. The method of claim 1, further comprising:

responsive to identifying a second indication that the performance of the processing system has improved and is at least equal to the specified criteria, offloading the at least one process for hosting the electronic conference session from the at least one of the plurality of client devices back to the processing system.

4. The method of claim 1, wherein the at least one of the plurality of client devices to which the at least one process for hosting the electronic conference session is transferred is selected based on a geographic region in which the at least one of the plurality of client devices resides.

5. The method of claim 1, wherein offloading the at least one process for hosting the electronic conference session from the processing system to the at least one of the plurality of client devices further is responsive to determining that a total number of participants in the conference session is below a threshold level.

6. The method of claim 1, wherein offloading the at least one process for hosting the electronic conference session from the processing system to the at least one of the plurality of client devices comprises:

offloading to the at least one of the plurality of client devices a process configured to host an instant messaging session for instant messages generated by participants of the conference session during the conference session.

7. A processing system comprising: a processor and a memory connected to the processor, the processor configured to initiate executable operations comprising:

hosting an electronic conference session for a plurality of users to participate in the conference session via a plurality of client devices;

monitoring performance of the procession system;

responsive to identifying a first indication that the performance of the processing system immanently will degrade below specified criteria, querying at least one of the plurality of client devices to determine whether a plugin configured to receive transfer of at least one process for hosting the electronic conference session is installed on the at least one of the plurality of client devices; and responsive to determining that the plugin is installed on the at least one of the plurality of client devices, offloading the at least one process for hosting the electronic conference session from the processing system to the at least one of the plurality of client devices.

8. The processing system of claim 7, wherein offloading the at least one process for hosting the electronic conference session from the processing system to the at least one of the plurality of client devices comprises:

offloading all processes for hosting of the electronic conference session from the processing system to the at least one of the plurality of client devices.

9. The processing system of claim 7, wherein the executable operations further comprise:

responsive to identifying a second indication that the performance of the processing system has improved and is at least equal to the specified criteria, offloading the at least one process for hosting the electronic conference session from the at least one of the plurality of client devices back to the processing system.

10. The processing system of claim 7, wherein the at least one of the plurality of client devices to which the at least one process for hosting the electronic conference session is transferred is selected based on a geographic region in which the at least one of the plurality of client devices resides.

11. The processing system of claim 7, wherein offloading the at least one process for hosting the electronic conference session from the processing system to the at least one of the plurality of client devices further is responsive to determining that a total number of participants in the conference session is below a threshold level.

12. The processing system of claim 7, wherein offloading the at least one process for hosting the electronic conference session from the processing system to the at least one of the plurality of client devices comprises:

offloading to the at least one of the plurality of client devices a process configured to host an instant messaging session for instant messages generated by participants of the conference session during the conference session.

13. A computer program product for managing an electronic conference session, the computer program product comprising:

a computer-readable storage device having stored thereon program code that, when executed, configures a processor to perform executable operations comprising:

on a processing system, hosting the electronic conference session for a plurality of users to participate in the conference session via a plurality of client devices;

monitoring, by the processor, performance of the processing system;

responsive to identifying a first indication that the performance of the processing system immanently will degrade below specified criteria, querying, by the processor, at least one of the plurality of client devices to determine whether a plugin configured to receive transfer of at least one process for hosting the electronic conference session is installed on the at least one of the plurality of client devices; and responsive to determining that the plugin is installed on the at least one of the plurality of client devices, offloading, by the processor, the at least one process for hosting the electronic conference session from the processing system to the at least one of the plurality of client devices.

14. The computer program product of claim 13, wherein offloading, by the processor, the at least one process for hosting the electronic conference session from the processing system to the at least one of the plurality of client devices comprises:

offloading all processes for hosting of the electronic conference session from the processing system to the at least one of the plurality of client devices.

15. The computer program product of claim 13, wherein the executable operations further comprise:

responsive to identifying a second indication that the performance of the processing system has improved and is at least equal to the specified criteria, offloading the at least one process for hosting the electronic conference session from the at least one of the plurality of client devices back to the processing system.

16. The computer program product of claim 13, wherein the at least one of the plurality of client devices to which the at least one process for hosting the electronic conference session is transferred is selected based on a geographic region in which the at least one of the plurality of client devices resides.

17. The computer program product of claim 13, wherein offloading at least one process for hosting the electronic conference session from the processing system to the at least one of the plurality of client devices further is responsive to determining that a total number of participants in the conference session is below a threshold level.

18. The computer program product of claim 13, wherein offloading, by the processor, the at least one process for hosting the electronic conference session from the processing system to the at least one of the plurality of client devices comprises:

offloading to the at least one of the plurality of client devices a process configured to host an instant messaging session for instant messages generated by participants of the conference session during the conference session.

* * * * *